United States Patent
Chen

(10) Patent No.: US 10,457,093 B2
(45) Date of Patent: Oct. 29, 2019

(54) STRUCTURE OF BICYCLE WHEEL RIM

(71) Applicant: ALEX GLOBAL TECHNOLOGY, INC., Tainan (TW)

(72) Inventor: Wei-Chin Chen, Tainan (TW)

(73) Assignee: Alex Global Technology, Inc., Tainan (TW)

( * ) Notice: Subject to any disclaimer, the term of this patent is extended or adjusted under 35 U.S.C. 154(b) by 143 days.

(21) Appl. No.: 15/649,813

(22) Filed: Jul. 14, 2017

(65) Prior Publication Data

US 2019/0016175 A1    Jan. 17, 2019

(51) Int. Cl.
   *B60B 21/10*    (2006.01)
   *B60B 5/00*     (2006.01)

(52) U.S. Cl.
   CPC .............. *B60B 21/104* (2013.01); *B60B 5/00* (2013.01); *B60B 2360/104* (2013.01); *B60B 2360/108* (2013.01); *B60B 2360/3416* (2013.01); *B60B 2900/111* (2013.01)

(58) Field of Classification Search
   CPC ... B60B 21/104; B60B 5/00; B60B 2900/111; B60B 2360/104; B60B 2360/3416; B60B 2360/108
   USPC .................................................... 301/95.102
   See application file for complete search history.

(56) References Cited

U.S. PATENT DOCUMENTS

| | | | | |
|---|---|---|---|---|
| 5,104,199 | A * | 4/1992 | Schlanger | B60B 1/003 301/64.704 |
| 7,464,994 | B2 * | 12/2008 | Okajima | B60B 1/041 301/58 |
| 8,905,491 | B2 * | 12/2014 | Koshiyama | B60B 1/003 301/95.102 |
| 2011/0241414 | A1 * | 10/2011 | Ono | B21K 1/28 301/63.103 |
| 2012/0025597 | A1 * | 2/2012 | Koshiyama | B60B 1/003 301/95.102 |
| 2014/0042798 | A1 * | 2/2014 | Iwai | B60B 5/02 301/95.102 |

FOREIGN PATENT DOCUMENTS

TW    M315661 U    11/1995

* cited by examiner

*Primary Examiner* — S. Joseph Morano
*Assistant Examiner* — Jean W Charleston
(74) *Attorney, Agent, or Firm* — Rosenberg, Klein & Lee

(57) ABSTRACT

A structure of a bicycle wheel rim is disclosed. It comprises an inner rim frame and a composite rim body. The inner rim frame is provided with an inner rim part, two lateral ring parts respectively disposed on both sides of the inner rim part, two hooks respectively disposed on terminals of the two lateral ring parts, and an opening formed between the two hooks and having a supporting part. The composite rim body encapsulates the inner rim part, the two lateral rings and the two hooks.

9 Claims, 8 Drawing Sheets

STRUCTURE OF BICYCLE WHEEL RIM

BACKGROUND OF THE INVENTION

1. Field of the Invention

The present invention relates to a structure of a bicycle wheel rim which can achieve the efficiency of lightening the weight of the bicycle wheel rim and assure the structural strength of the bicycle wheel rim.

2. Description of Related Art

Most of the conventional bicycle wheel rims, as shown in FIG. 8, are made of complete metal rims (3). Although having heat resistance and strong tire receiving parts, the conventional bicycle wheel rim are too heavy and thus cannot keep up with the trend of lightweight bikes. Accordingly, various bicycle wheel rims are continually developed to meet the demands for rigidity, light-weight, aerodynamics design, and simplified manufacturing and assembling processes. Nowadays, bicycle wheel rims have gradually turned to the designs using complete carbon based rim in the market and related industries.

The conventional techniques of shaping the bicycle wheel rims comprise the steps of preparing an annular pocket filled with air therein to plump up; and then coating multiple layers of carbon-fiber cloths on an outer surface of the annular pocket, wherein the number of layers coated depends on the structural strength required for the bicycle wheel rims. Generally, the outer surface for disposing spokes are coated with about seven layers of carbon-fiber cloths to achieve a high structural strength while the other portions of the annular pocket having lower structural strength requirements are only coated with about five layers. However, there are many disadvantages of the conventional techniques. For instance, a conventional bicycle wheel rim requires pasting or covering the carbon-fiber cloths layer by layer, so the manufacturing process is very time-consuming and laborious. Moreover, a lateral side of the carbon-fiber wheel rim is thin, so "burning rim" may occur due to the brake pads rubbing the carbon-fiber wheel rim at a high speed in a short period of time. In such a case, the carbon-fiber wheel rim is prone to distortion and causing a gap between a tire and the carbon-fiber wheel rim, which results in air leaks.

In order to solve the abovementioned problems, a Taiwan patent No. M315661 U, issued on 21 Jul. 2007, has disclosed a bicycle rim with composite materials. It comprises a composite rim body made of a composite material and shaped as a hollow ring, a main body having a first side wall and a second side wall respectively disposed on two sides thereof, a tire receiving part having a first brake surface connected to the first side wall and a second brake surface connected to the second side wall, and a metal reinforced frame made of a metal material and shaped as a hoop. The metal reinforced frame is encapsulated by the tire receiving part of the composite rim body and further provided with two horizontal sidewalls almost parallel to each other and respectively relate to the first brake surface and the second brake surface.

Although the abovementioned structure has an advantage of lightweight, the structural strength of the first side wall and the second side wall is not good enough to bond the metal reinforced frame, so the junction of the first side wall, the second side wall, and the metal reinforced frame is prone to break due to external forces.

SUMMARY OF THE INVENTION

In view of the above-mentioned problems, the object of the present invention is to provide a structure of a bicycle wheel rim which can achieve the efficiency of lightening the weight of the bicycle wheel rim and assure the whole structural strength of the bicycle.

Disclosed herein is a structure of a bicycle wheel rim. It comprises an inner rim frame and a composite rim body. The inner rim frame is provided with an inner rim part, two lateral ring parts respectively disposed on both sides of the inner rim part, and an opening formed between the two lateral ring parts and having a supporting part. The composite rim body encapsulates the inner rim part, the two lateral rings and two hooks. Accordingly, the present invention can achieve the efficiency of lightening the weight of the bicycle wheel rim and assure the whole structural strength of the bicycle wheel rim at the same time.

According to an embodiment of the present invention, the composite rim body comprises a first ring segment encapsulating the inner rim part, two second ring segments encapsulating the two lateral ring parts, a third ring segment having two protrusions and encapsulating terminals of the two lateral ring parts, and the supporting part disposed on the opening thereof.

According to an embodiment of the present invention, each of the two lateral ring parts is provided with a hook at the terminal thereof and an opening formed between the two hooks.

According to an embodiment of the present invention, the composite rim body comprises a first ring segment encapsulating the inner rim part, two second ring segments encapsulating the two lateral ring parts, a third ring segment encapsulating terminals of the two hooks, and a supporting part disposed on the opening thereof.

According to an embodiment of the present invention, the composite rim body is made of a carbon-fiber composite material, especially made of a carbon-fiber composite material having a wear-resistant characteristic.

According to an embodiment of the present invention, the inner rim frame is made of a lightweight metal material including aluminum, aluminum alloy, molybdenum chromium alloy, titanium alloy or magnesium alloy.

Compared with the technique available now, the present invention has the following advantages:

1. The design of an opening formed between the two lateral ring parts can reduce the overall weight of the inner rim frame. Moreover, the composite rim body having a light weight and encapsulating the inner rim part can also achieve efficacy of reducing the weight of the bicycle wheel rim.

2. The design of the composite rim body having characteristics of wear-resistance, encapsulating the inner rim part, and sealing the opening between the two hooks at the same time can closely link the two hooks on both sides of the bicycle wheel rim and achieve efficacy of increasing the whole structural strength of the bicycle wheel rim.

3. The composite rim body encapsulating the inner rim part made of a lightweight metal material can increase the whole structural strength of the bicycle wheel rim, dissipate heat and cool down quickly when the brake pads rub the bicycle wheel rim so as to prevent the bicycle wheel rim from distortion.

DETAILED DESCRIPTION OF THE PREFERRED EMBODIMENT

Hereinafter, an exemplary embodiment of the present invention will be described in detail with reference to the accompanying drawings.

Figure 1:
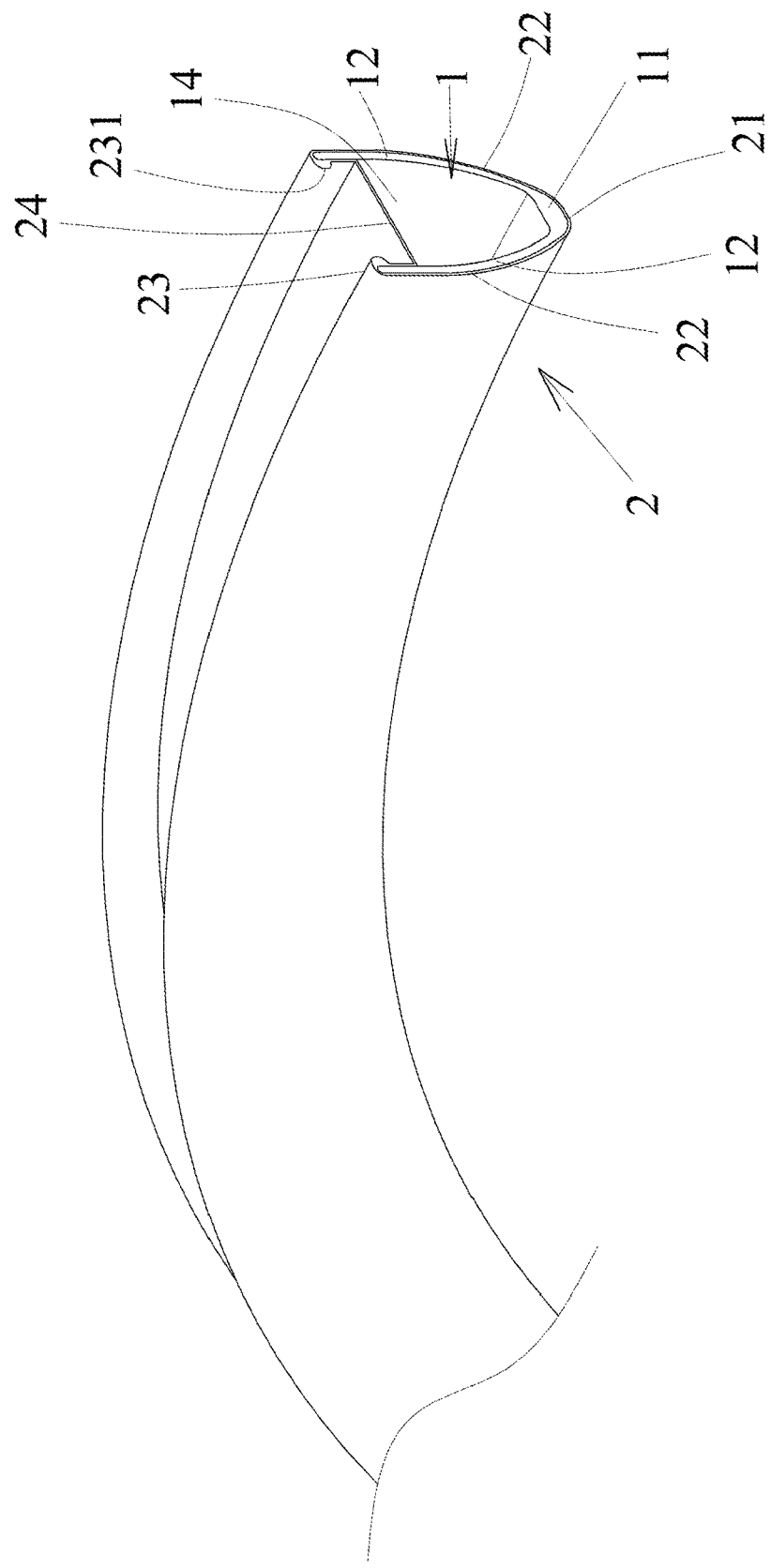
FIG. 1 is a stereogram of a first embodiment showing a structure of a bicycle wheel rim according to the present invention.
Figure 2:
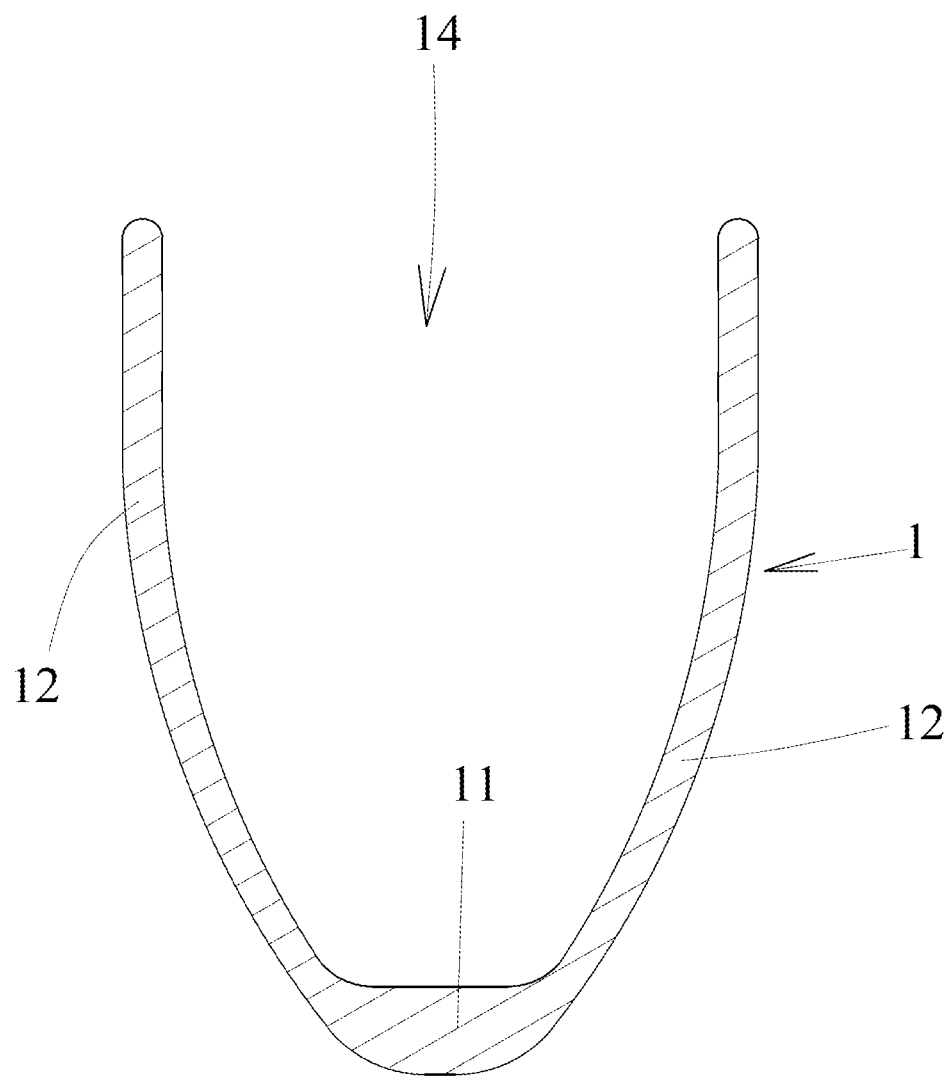
FIG. 2 is a cross-sectional diagram of a first embodiment showing an inner rim frame according to the present invention.
Figure 3:
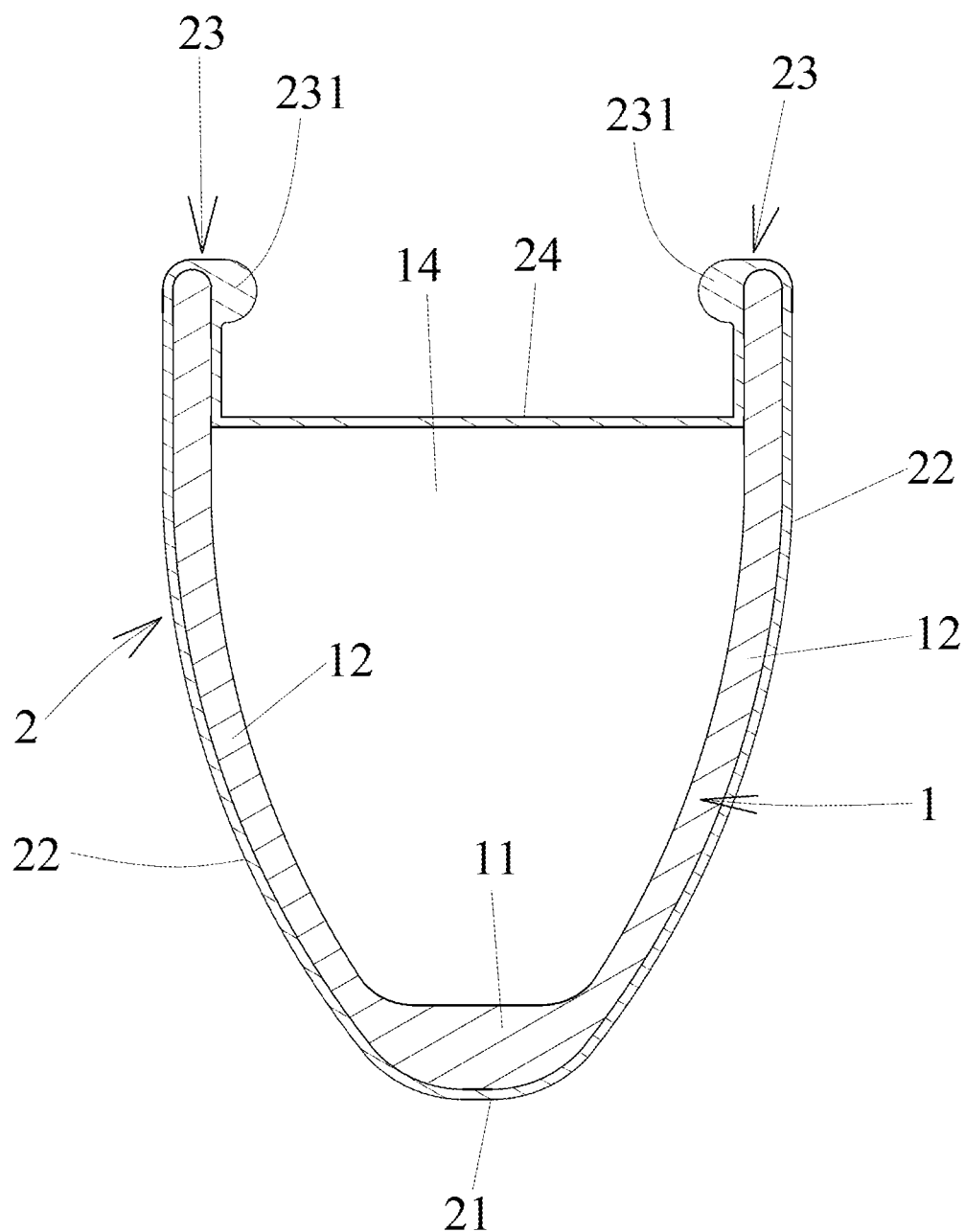
FIG. 3 is a cross-sectional diagram of a first embodiment showing a structure of a bicycle wheel rim according to the present invention.

As showed in FIGS. 1-3, a first embodiment showing a structure of a bicycle wheel rim according to the present invention is disclosed. It comprises:

an inner rim frame (1) having an inner rim part (11) corresponding to plural spokes, two lateral ring parts (12) respectively disposed on both sides of the inner rim part (11), and an opening (14) formed between the two lateral ring parts (12); and a composite rim body (2) correspondingly encapsulating the inner rim frame (1) and having a first ring segment (21) encapsulating the inner rim part (11), two second ring segments (22) encapsulating the two lateral ring parts (12), a third ring segment (23) having two protrusions (231) and encapsulating terminals of the two lateral ring parts (12), and a supporting part (24) disposed on the opening (14) thereof.

Referring to FIGS. 1-3, the inner rim frame (1) is made of a lightweight metal material including aluminum, aluminum alloy, molybdenum chromium alloy, titanium alloy or magnesium alloy and shaped as a hoop skeleton. The inner rim frame (1) mainly comprises an inner rim part (11) for correspondingly assembling plural spokes thereon, two lateral ring parts (12) respectively extended from both sides of the inner rim part (11). The terminals of the two lateral ring parts (12) are used to assemble a tire, and an opening (14) is formed between the two lateral ring parts (12) as shown in FIG. 2. Furthermore, a composite rim body (2) is used for correspondingly encapsulating an external of the inner rim frame (1) and the composite rim body (2) is made of a carbon-fiber composite material, especially made of a carbon-fiber composite material having a wear-resistant characteristic. The composite rim body (2) comprises a first ring segment (21) encapsulating the inner rim part (11), two second ring segments (22) encapsulating the two lateral ring parts (12), a third ring segment (23) encapsulating terminals of the two lateral ring parts (12) and having two protrusions (231) for correspondingly assembling a tire, and a supporting part (24) disposed on the opening (14) thereof for tightly connecting the terminals of the two lateral ring parts (12). Accordingly, the structure of a bicycle wheel rim can increase the structural strength in assembling a tire and has a simplified process to manufacture the whole bicycle wheel rim with greater rigidity and lighter weight.

Figure 4:
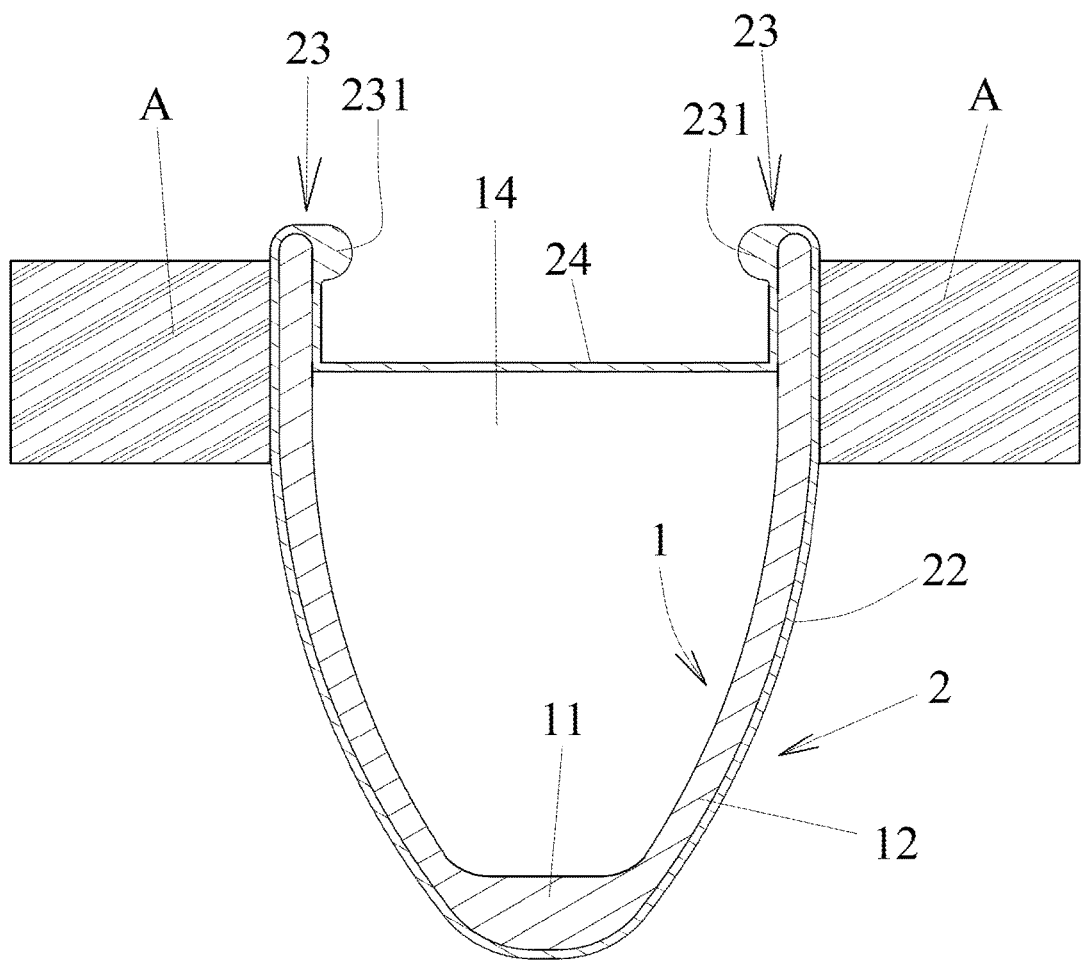
FIG. 4 is a cross-sectional diagram showing a bicycle wheel rim clamped by two brake pads.

Referring to FIG. 4, when a vehicle is braked and a plurality of brake pads (A) rub on both sides of the bicycle wheel rim at a high speed in a short period of time, the design of the inner rim frame (1) inside the bicycle wheel rim let the whole bicycle wheel rim have enough strength to withstand external forces. Additionally, the inner rim frame (1) can dissipate heat generated by friction and cool down quickly, so the phenomenon of "burning rim" may not occur and the whole bicycle wheel rim can keep integral without distortion.

Figure 5:
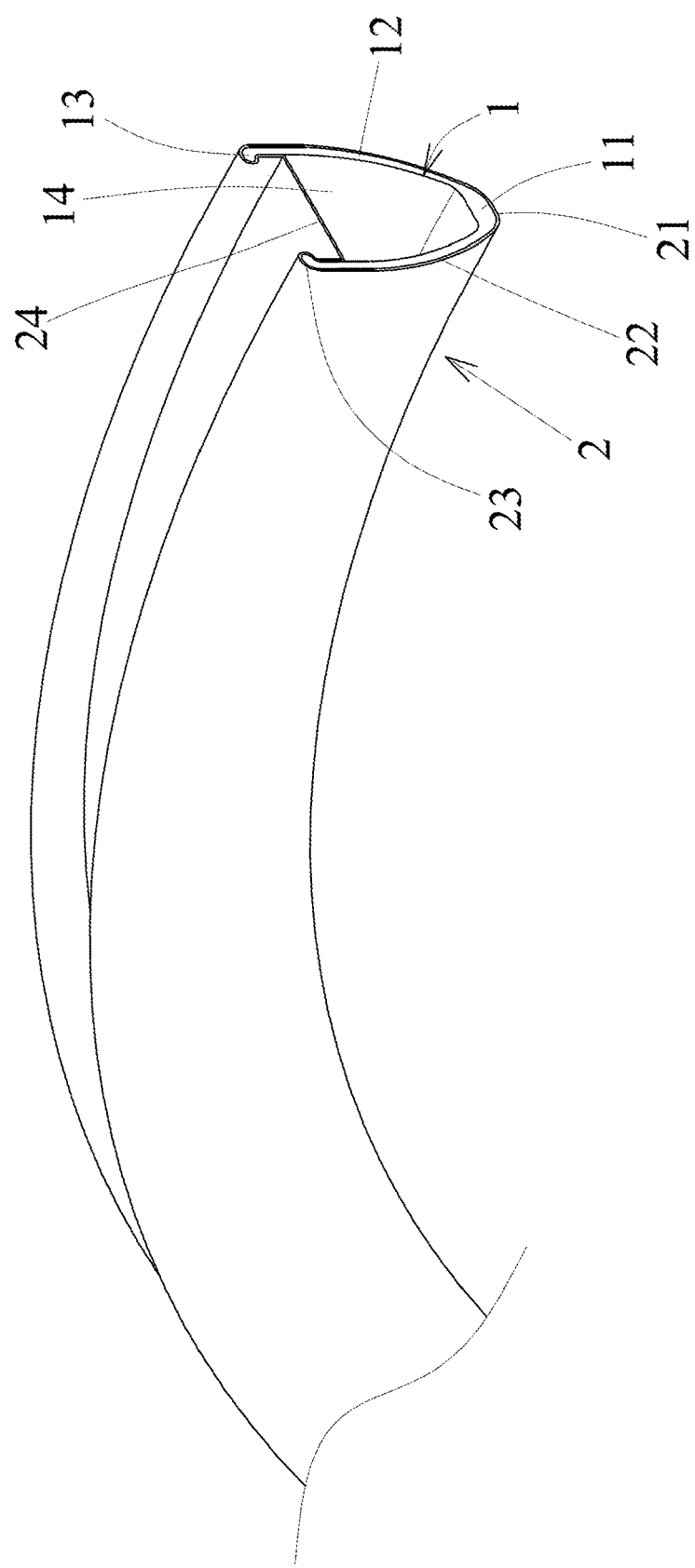
FIG. 5 is a stereogram of a second embodiment showing a structure of a bicycle wheel rim according to the present invention.
Figure 6:
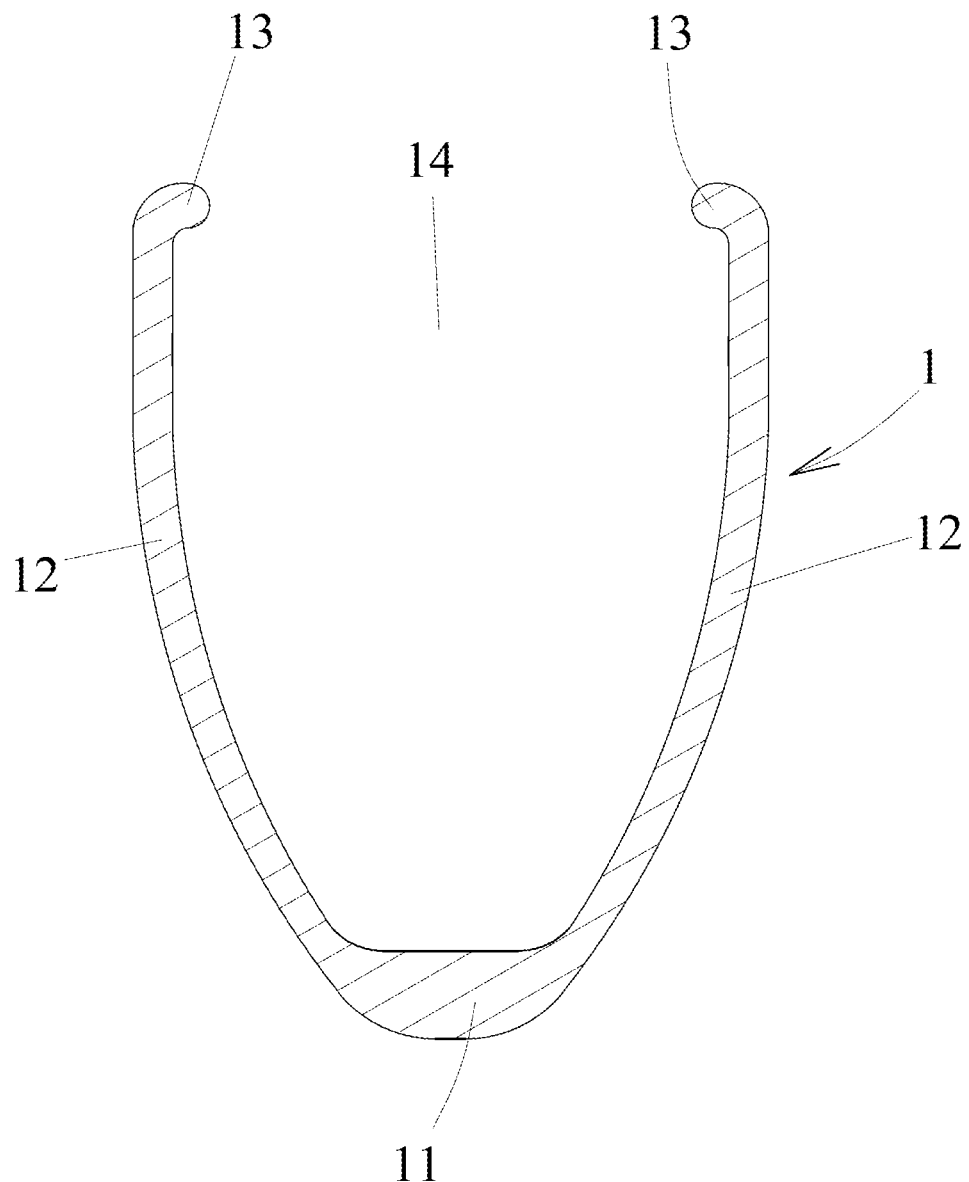
FIG. 6 is a cross-sectional diagram of a second embodiment showing an inner rim frame according to the present invention.
Figure 7:
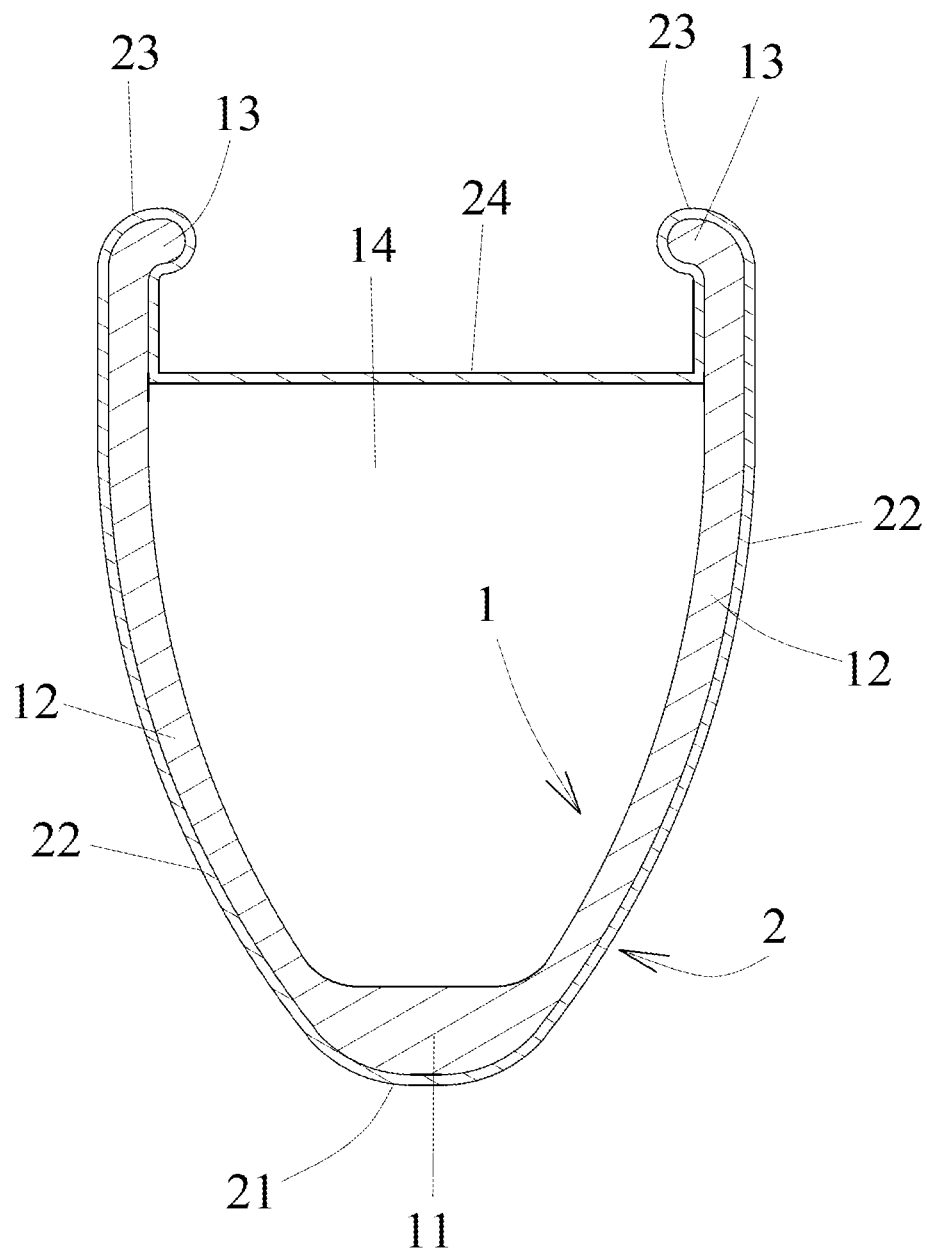
FIG. 7 is a cross-sectional diagram of a second embodiment showing a structure of a bicycle wheel rim according to the present invention.
Figure 8:
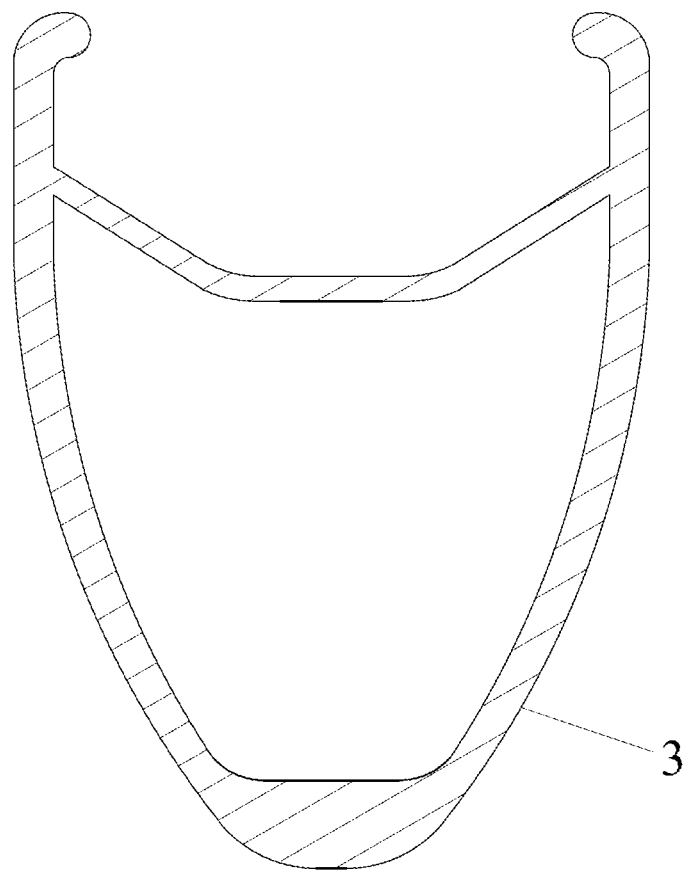
FIG. 8 is a schematic diagram showing a complete metal rim of a conventional technique.

As shown in FIGS. 5-7, a second embodiment showing a structure of a bicycle wheel rim according to the present invention is disclosed. It comprises an inner rim frame (1) having an inner rim part (11) corresponding to plural spokes, two lateral ring parts (12) respectively disposed on both sides of the inner rim part (11), two hooks (13) respectively disposed at terminals of the two lateral ring parts (12), and an opening (14) formed between the two hooks (13); and a composite rim body (2) encapsulating the inner rim frame (1) and having a first ring segment (21) encapsulating the inner rim part (11), two second ring segments (22) encapsulating the two lateral ring parts (12), a third ring segment (23) encapsulating terminals of the two hooks (13), and a supporting part (24) disposed on the opening (14) thereof.

Referring to FIGS. 5-7, the inner rim frame (1) is made of a lightweight metal material including aluminum, aluminum alloy, molybdenum chromium alloy, titanium alloy or magnesium alloy and shaped as a hoop skeleton. The inner rim frame (1) mainly comprises an inner rim part (11) for correspondingly assembling plural spokes thereon, two lateral ring parts (12) respectively extended from both sides of the inner rim part (11). The terminals of the two lateral ring parts (12) are provided with two hooks (13) used to assemble a tire, and an opening (14) is formed between the two hooks (13) as shown in FIG. 6. Furthermore, a composite rim body (2) is used for correspondingly encapsulating an external of the inner rim frame (1) and the composite rim body (2) is made of a carbon-fiber composite material, especially made of a carbon-fiber composite material having a wear-resistant characteristic. The composite rim body (2) comprises a first ring segment (21) encapsulating the inner rim part (11), two second ring segments (22) encapsulating the two lateral ring parts (12), a third ring segment (23) encapsulating the two hooks (13), and a supporting part (24) disposed on the opening (14) thereof for tightly connecting the two hooks (13). Accordingly, the structure of a bicycle wheel rim can increase the structural strength in assembling a tire and has a simplified process to manufacture the whole bicycle wheel rim with greater rigidity and lighter weight.

Compared with the technique available now, the present invention has the following advantages:

1. The design of an opening formed between the two lateral ring parts can reduce the overall weight of the inner rim frame. Moreover, the composite rim body having a light weight and encapsulating the inner rim part can also achieve efficacy of reducing the weight of the bicycle wheel rim.

2. The design of the composite rim body having characteristics of wear-resistance, encapsulating the inner rim part, and sealing the opening between the terminals of the two lateral ring parts at the same time can closely link the two lateral ring parts on both sides of the bicycle wheel rim and achieve efficacy of increasing the whole structural strength of the bicycle wheel rim.

3. The composite rim body encapsulating the inner rim part made of a lightweight metal material can increase the whole structural strength of the bicycle wheel rim, dissipate heat and cool down quickly when the brake pads rub the bicycle wheel rim so as to prevent the bicycle wheel rim from distortion.

What is claimed is:

1. A structure of a bicycle wheel rim, comprising:
an inner rim frame having an inner rim part corresponding to a plurality of spokes, and two lateral ring parts respectively disposed on both sides of the inner rim part, the inner rim frame defining an internal space extending radially from an opening formed between the two lateral ring parts; and
a composite rim body encapsulating the inner rim part and the two lateral ring parts of the inner rim frame, the composite rim body having a first ring segment encapsulating the inner rim part of the inner rim frame, two second ring segments encapsulating the two lateral ring parts of the inner rim frame, a third ring segment having two protrusions and encapsulating terminals of the two lateral ring parts of the inner rim frame, and a supporting part covering the opening of the internal space of the inner rim frame to enclose the internal space defined by the inner rim frame.

2. As the structure of a bicycle wheel rim claimed in claim 1, wherein the composite rim body is an outermost layer, and is made of a carbon-fiber composite material.

3. As the structure of a bicycle wheel rim claimed in claim 1, wherein the inner rim frame is made of a lightweight metal material including at least one of aluminum, aluminum alloy, molybdenum chromium alloy, titanium alloy and magnesium alloy.

4. A structure of a bicycle wheel rim, comprising:
an inner rim frame having an inner rim part corresponding to a plurality of spokes, two lateral ring parts respectively disposed on both sides of the inner rim part, and two hooks respectively disposed at terminals of the two lateral ring parts, the inner rim frame defining an internal space extending radially from an opening formed between the two hooks; and
a composite rim body encapsulating the inner rim part and the two lateral ring parts of the inner rim frame, the composite rim body having a first ring segment encapsulating the inner rim part of the inner rim frame, two second ring segments encapsulating the two lateral ring parts of the inner rim frame, a third ring segment encapsulating terminals of the two hooks of the inner rim frame, and a supporting part covering the opening of the internal space of the inner rim frame to enclose the internal space defined by the inner rim frame.

5. As the structure of a bicycle wheel rim claimed in claim 4, wherein the composite rim body is an outermost layer, and is made of a carbon-fiber composite material.

6. As the structure of a bicycle wheel rim claimed in claim 4, wherein the inner rim frame is made of a lightweight metal material including at least one of aluminum, aluminum alloy, molybdenum chromium alloy, titanium alloy and magnesium alloy.

7. A structure of a bicycle wheel rim, comprising:
an inner rim frame made of a metal material, the inner rim frame having an inner rim part and two lateral ring parts respectively disposed on both sides of the inner rim part, the inner rim frame defining an internal space extending radially from an opening formed between the two lateral ring parts; and
a composite rim body made of a composite material, the composite rim body encapsulating the inner rim part and the two lateral ring parts of the inner rim frame, the composite rim body having a first ring segment encapsulating the inner rim part of the inner rim frame, two second ring segments encapsulating the two lateral ring parts of the inner rim frame, a third ring segment having two protrusions and encapsulating terminals of the two lateral ring parts of the inner rim frame, and a supporting part covering the opening of the internal space of the inner rim frame to enclose the internal space defined by the inner rim frame.

8. As the structure of a bicycle wheel rim claimed in claim 7, wherein the composite rim body is an outermost layer, and the composite material of the composite rim body includes a carbon-fiber composite material.

9. As the structure of a bicycle wheel rim claimed in claim 7, wherein the metal material of the inner rim frame includes at least one of aluminum, aluminum alloy, molybdenum chromium alloy, titanium alloy, and magnesium alloy.

* * * * *